US006192428B1

(12) United States Patent
Abramson et al.

(10) Patent No.: US 6,192,428 B1
(45) **Date of Patent: *Feb. 20, 2001**

(54) METHOD/APPARATUS FOR DYNAMICALLY CHANGING FIFO DRAINING PRIORITY THROUGH ASYNCHRONOUS OR ISOCHRONOUS DMA ENGINES IN RESPONSE TO PACKET TYPE AND PREDETERMINED HIGH WATERMARK BEING REACHED

(75) Inventors: Darren L. Abramson, Folsom, CA (US); C. Brendan S. Traw, Portland, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/023,493

(22) Filed: Feb. 13, 1998

(51) Int. Cl.[7] .......... G06F 12/00; G06F 13/00; G06F 13/28; G06F 13/30

(52) U.S. Cl. .......... 710/52; 710/29; 710/40; 710/41; 710/53; 710/57

(58) Field of Search .......... 710/1, 29, 34, 710/15, 52, 53, 57, 60, 40, 41; 370/401, 402, 404, 902

(56) References Cited

U.S. PATENT DOCUMENTS

| | | | | |
|---|---|---|---|---|
| 5,121,480 | | 6/1992 | Bonke et al. | 395/250 |
| 5,208,810 | * | 5/1993 | Park | 370/94.1 |
| 5,448,701 | * | 9/1995 | Metz, Jr. et al. | 395/293 |
| 5,473,604 | * | 12/1995 | Lorenz et al. | 370/60 |
| 5,541,926 | * | 7/1996 | Saito et al. | 370/94.2 |
| 5,546,543 | * | 8/1996 | Yang et al. | 395/250 |
| 5,592,622 | * | 1/1997 | Isfeld et al. | 395/200.02 |
| 5,664,223 | * | 9/1997 | Bender et al. | 395/842 |
| 5,687,348 | * | 11/1997 | Whittaker | 395/460 |
| 5,717,904 | * | 2/1998 | Ehlers et al. | 395/511 |
| 5,732,094 | * | 3/1998 | Petersen et al. | 371/51.1 |
| 5,802,059 | * | 9/1998 | Hayashi | 370/429 |
| 5,822,300 | * | 5/1999 | Johnson et al. | 370/229 |
| 5,845,239 | * | 12/1998 | Laczko, Sr. et al. | 704/200 |
| 5,854,910 | * | 12/1998 | Gulick | 395/309 |
| 5,872,919 | * | 2/1999 | Wakeland | 395/200.6 |
| 5,877,741 | * | 3/1999 | Chee et al. | 345/113 |
| 5,881,313 | * | 3/1999 | Ramakrishnan et al. | 395/860 |
| 5,904,732 | * | 5/1999 | Greenley et al. | 710/57 |
| 5,983,301 | * | 11/1999 | Baker et al. | 710/113 |
| 5,991,304 | * | 11/1999 | Abramson | 370/413 |
| 6,026,444 | * | 2/2000 | Quattromani et al. | 709/232 |
| 6,091,707 | * | 7/2000 | Egbert et al. | 370/229 |

* cited by examiner

*Primary Examiner*—Thomas C. Lee
*Assistant Examiner*—Tanh Nguyen
(74) *Attorney, Agent, or Firm*—Blakely, Sokoloff, Taylor & Zafman LLP

(57) ABSTRACT

A method of dynamically changing draining priority in a first-in/first out ("FIFO") device to prevent over-run errors is described. The method includes the steps of detecting data received in the FIFO, asserting a request to drain the FIFO, detecting when an amount of data received in the FIFO has reached a predetermined high watermark value, and asserting a higher priority request to drain the FIFO. The method further includes the steps of detecting when the amount of data received in the FIFO has fallen below the predetermined high watermark value, maintaining assertion of the higher priority request, detecting when the amount of data in the FIFO has fallen below a predetermined hysteresis value, and deasserting the higher priority request to drain the FIFO.

27 Claims, 7 Drawing Sheets

380 375 370 365
IPREQ IREQ APREQ AREQ
240
230
ADDR DATA CTL
ISOC DMA ENGINE
320
395 IIGNT
385 INTERNAL ARBITER
390 IAGNT
ASYNC DMA ENGINE
315
360 PRIORITY GENERATION CIRCUIT
PD 362
330 FIFO FILL POINTER
335 QUADLET COUNT CIRCUIT
FIFO DRAIN POINTER 325
RECEIVE FIFO 310
353 HYS 350 COMPARATOR
343
342 SUBTRACTOR
355 HYSTERESIS PROGRAMMABLE REGISTER
HWM 340 COMPARATOR
345 HIGH WATERMARK PROGRAMMABLE REGISTER
305 DATA PACKET DECODER
TO 1394 LINK INTERFACE

100
PROCESSOR
105
110
NORTH BRIDGE
115
MEMORY
120
GRAPHICS INTERFACE
125
AGP
PCI BUS
130
DEVICE 1
135₁
DEVICE M
135M
SOUTH BRIDGE
140
ISA BUS
145
DEVICE 1
150₁
DEVICE N
150N
1394 PHY
155
NODE 1
160₁
NODE P
160P

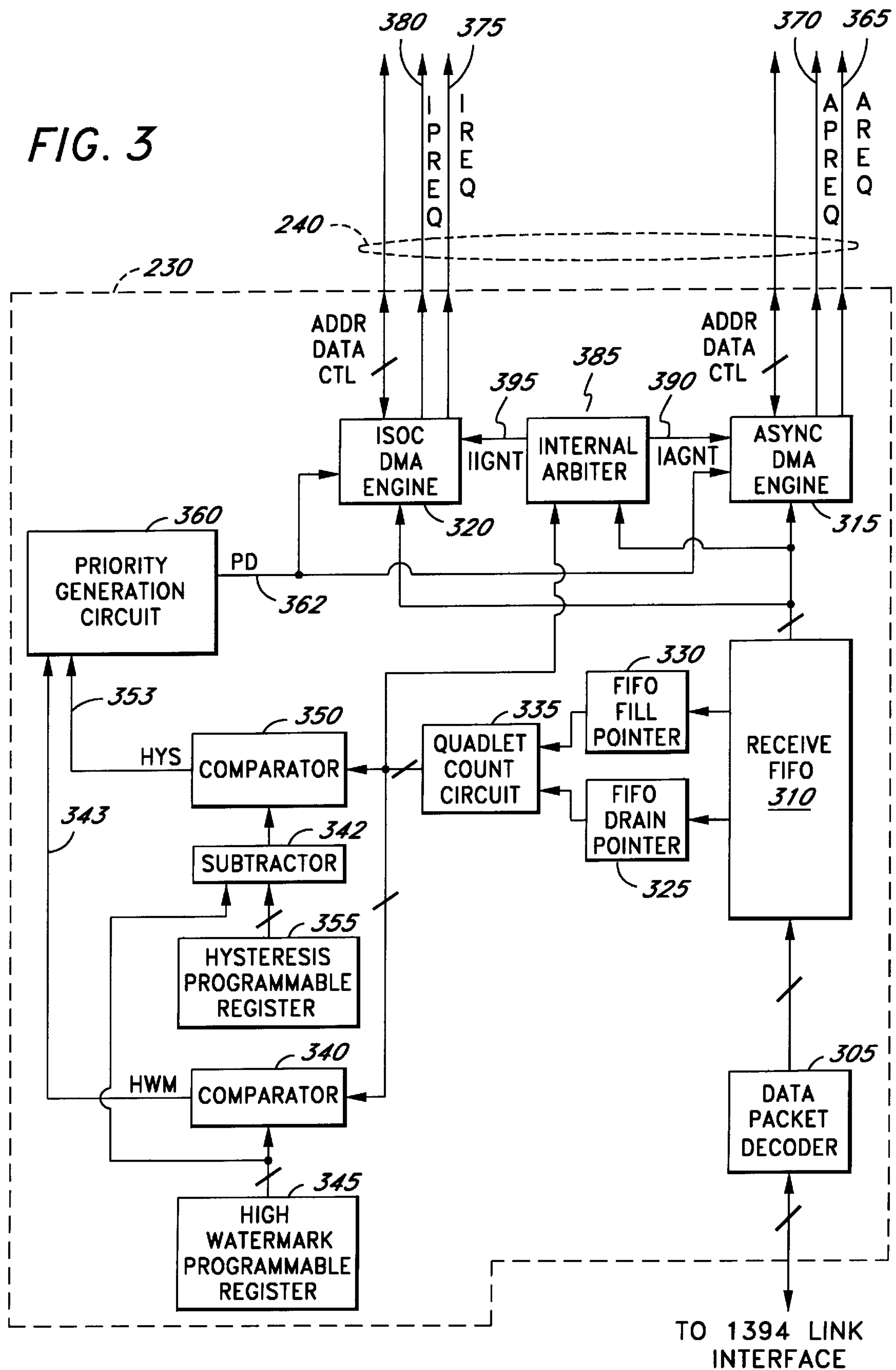
FIG. 3
380
375
370
365
IPREQ
IREQ
APREQ
AREQ
240
230
ADDR
DATA
CTL
ADDR
DATA
CTL
395
385
390
ISOC DMA ENGINE
IIGNT
INTERNAL ARBITER
IAGNT
ASYNC DMA ENGINE
320
315
360
PRIORITY GENERATION CIRCUIT
PD
362
330
FIFO FILL POINTER
RECEIVE FIFO 310
353
350
335
HYS
COMPARATOR
QUADLET COUNT CIRCUIT
FIFO DRAIN POINTER
343
342
SUBTRACTOR
325
355
HYSTERESIS PROGRAMMABLE REGISTER
340
305
HWM
COMPARATOR
DATA PACKET DECODER
345
HIGH WATERMARK PROGRAMMABLE REGISTER
TO 1394 LINK INTERFACE HWM=0
HYS=X
510
505
IDLE
515
HWM=1
HYS=1
HWM=0
HYS=0
550
HWM=0
HYS=1
545
HWM=1
HYS=1
HWM=1
HYS=1
HYS
HWM
540
535
530
HWM=0
HYS=1
520
525

360
565
575
570
HYS
A
B
$D_A$
A
555
580
$\overline{HWM}$
PD
HWM
$D_B$
B
560
585
CLK 600
START
A
605
DETERMINE QUADLET COUNT IN FIFO.
660
DEASSERT ANY NORMAL REQUESTS
610
QUADLET COUNT ≥ PERDETERMINED AMOUNT ?
NO
YES
615
IS DATA ON TOP OF FIFO ASYNC OR ISOC ?
ASYNC
ISOC
620
SIGNAL ASYNC DMA ENGINE TO ASSERT ASYNC NORMAL REQUEST TO DRAIN FIFO
625
SIGNAL ISOC DMA ENGINE TO ASSERT ISOC NORMAL REQUEST TO DRAIN FIFO
630
IS QUADLET COUNT ≥ A PROGRAMMED HIGH WATERMARK VALUE ?
NO
YES

METHOD/APPARATUS FOR DYNAMICALLY CHANGING FIFO DRAINING PRIORITY THROUGH ASYNCHRONOUS OR ISOCHRONOUS DMA ENGINES IN RESPONSE TO PACKET TYPE AND PREDETERMINED HIGH WATERMARK BEING REACHED

BACKGROUND OF THE INVENTION

1. Field of the Invention

The present invention relates generally to the field of computer systems, and specifically, to a method and apparatus for dynamically changing draining priority of a receive FIFO.

2. Background Information

Generally, first-in/first-out devices ("FIFOs") are used to buffer data that originates from one bus architecture and is targeted to a device in another bus architecture. For example, a computer system may include a processor, memory, and one or more peripheral devices coupled together by a first bus architecture (e.g., a system bus). A second bus architecture may include a serial peripheral bus (e.g., a universal serial bus "USB", a 1394 serial bus, IEEE 1394-1995 High Performance Serial Bus IEEE, 1995, etc.) with one or more peripheral devices coupled thereto. A bus bridge containing FIFOs therein is typically used to bridge and buffer transactions between the first and second bus architectures.

Data that is received in a receive FIFO from a peripheral device on the serial bus must be placed in memory for processing by the processor. If data is not placed in memory fast enough, a data over-run condition may occur (i.e., when data is received by a full FIFO to cause data already contained therein to be overwritten). Typical prior art receive FIFOs generate a request to drain the FIFO into memory when the FIFO becomes almost full (e.g., 90% full) and do not appear to have any programmable features to change this. However, before data can be drained from the FIFO into memory, access to the bus is required. The time that it takes to gain access to the bus (referred to as "bus latency") is non-deterministic and depends on several factors including the bus speed, the number of devices requesting access to the bus, and the like. Thus, since the bus architecture is susceptible to bus latencies and the serial peripheral device that is originating the data cannot be throttled, an over-run condition may occur, thereby resulting in a loss of data.

The depth of the receive FIFO is one factor in determining the bus latency that the FIFO can handle without an over-run condition occurring. The issue of bus latency is exacerbated by the fact that prior to writing data from the receive FIFO into memory, one or more commands may need to be fetched from memory. That is, a typical data packet received in a FIFO may require a command fetch, data storage, and status write-back, all to different locations in memory.

One possible solution is to provide first and second FIFOs where when one FIFO becomes full with data, the data is switched to the other FIFO while the first FIFO drains. However, this possible solution requires two buffers which adds complexity to the system and decreases the granularity for draining the FIFOs. Moreover, this solution may still cause an over-run condition when using a high speed serial bus (e.g., a 1394 serial bus).

Accordingly, there is a need for a method and apparatus to dynamically change draining priority of a receive FIFO to prevent data over-run conditions.

SUMMARY OF THE INVENTION

In one aspect, the present invention is a method of dynamically changing draining priority in a first-in/first out ("FIFO") device to prevent over-run errors. The method includes the steps of detecting data received in the FIFO, asserting a request to drain the FIFO, detecting when an amount of data received in the FIFO has reached a predetermined high watermark value, and asserting a higher priority request to drain the FIFO.

BRIEF DESCRIPTION OF THE DRAWINGS

The features and advantages of the present invention will become apparent from the following detailed description of the present invention in which:

FIG. 3 illustrates an exemplary embodiment of a receive module of the present invention.

DESCRIPTION OF THE PREFERRED EMBODIMENT

In the following description, for purposes of explanation, numerous details are set forth in order to provide a thorough understanding of the present invention. However, it will be apparent to one skilled in the art that these specific details are not required in order to practice the present invention. As discussed herein, a "computer system" is a product including circuitry capable of processing data. The computer system may include, but is not limited or restricted to, a conventional computer (e.g., laptop, desktop, palmtop, server, mainframe, etc.), hard copy equipment (e.g., printer, plotter, scanner, fax machine, etc.), banking equipment (e.g., an automated teller machine), wireless communication equipment, and the like.

Figure 1:
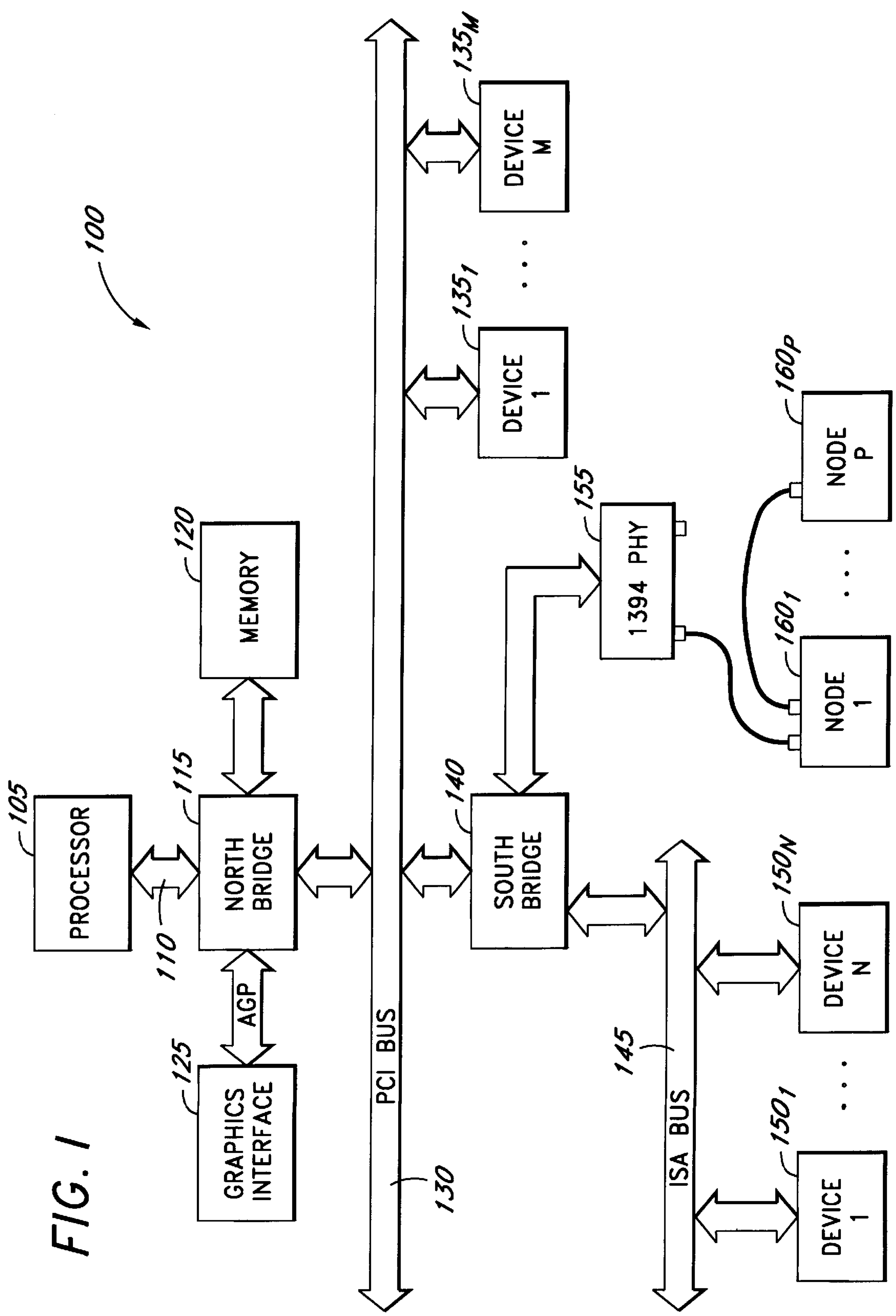
FIG. 1 illustrates an exemplary computer system suitable for use with the present invention.

FIG. 1 illustrates an exemplary computer system 100 suitable for use with the present invention. The computer system 100 includes a processor 105 coupled to a host bridge 115 (hereinafter referred to as a "north bridge") by way of host bus 110. Processor 105 may be any type of processor such as a microcontroller or a general purpose microprocessor. In the embodiment shown, the north bridge 115 is a host to peripheral component interconnect ("PCI") bridge, although other bridges may be used in lieu thereof. The north bridge 115 is coupled to system memory 120 (e.g., dynamic random access memory "DRAM", static RAM "SRAM", etc.), PCI bus 130, and graphics interface 125. The north bridge 115 is responsible for bridging processor transactions to either system memory 120, PCI bus 130, or graphics interface 125. The north bridge 115 also bridges graphics interface 125 or PCI mastered transactions to system memory 120 while initiating processor 105 cache snoop cycles.

The PCI bus 130 provides a communication path between processor 105 or system memory 120 and one or more peripheral devices $\mathbf{135}_1$–$\mathbf{135}_M$ (e.g., a network interface card, a SCSI controller card, etc.), where "M" is a positive whole number. The PCI bus 130 further provides a communication path between the processor 105 or system memory 120 and a second bridge 140 (hereinafter referred to as a "south bridge").

In one embodiment, the south bridge 140, among other things, serves two major purposes. First, south bridge 140 bridges transactions between PCI bus 130 and an expansion bus 145. In the embodiment shown, the expansion bus 145 is an industry standard architecture ("ISA") bus, although any other type of bus architecture may be used in lieu thereof. The expansion bus 145 provides a communication path between PCI bus 130 and a plurality of expansion peripheral devices $\mathbf{150}_1$–$\mathbf{150}_N$ (e.g., a disk drive controller, a sound card, a modem, a serial and parallel port controller, etc.), where "N" is a positive whole number.

Second, south bridge 140 bridges transactions from PCI bus 130 and a serial bus 160. In the preferred embodiment, the serial bus 160 is a 1394 serial bus in accordance with "IEEE 1394-1995 High Performance Serial Bus" published in 1995, although any other serial bus architecture may be used. The south bridge 140 is coupled to a 1394 physical interface 155. The physical interface 155 is coupled to a plurality of nodes $\mathbf{165}_1$–$\mathbf{165}_P$ (where "P" is a positive whole number) by way of 1394 serial bus 160. It is to be appreciated by one skilled in the art that the specific architecture of the computer system 100 is not critical in practicing the present invention, as variations may be made to the computer system 100 without departing from the spirit and scope of the present invention.

Figure 2:
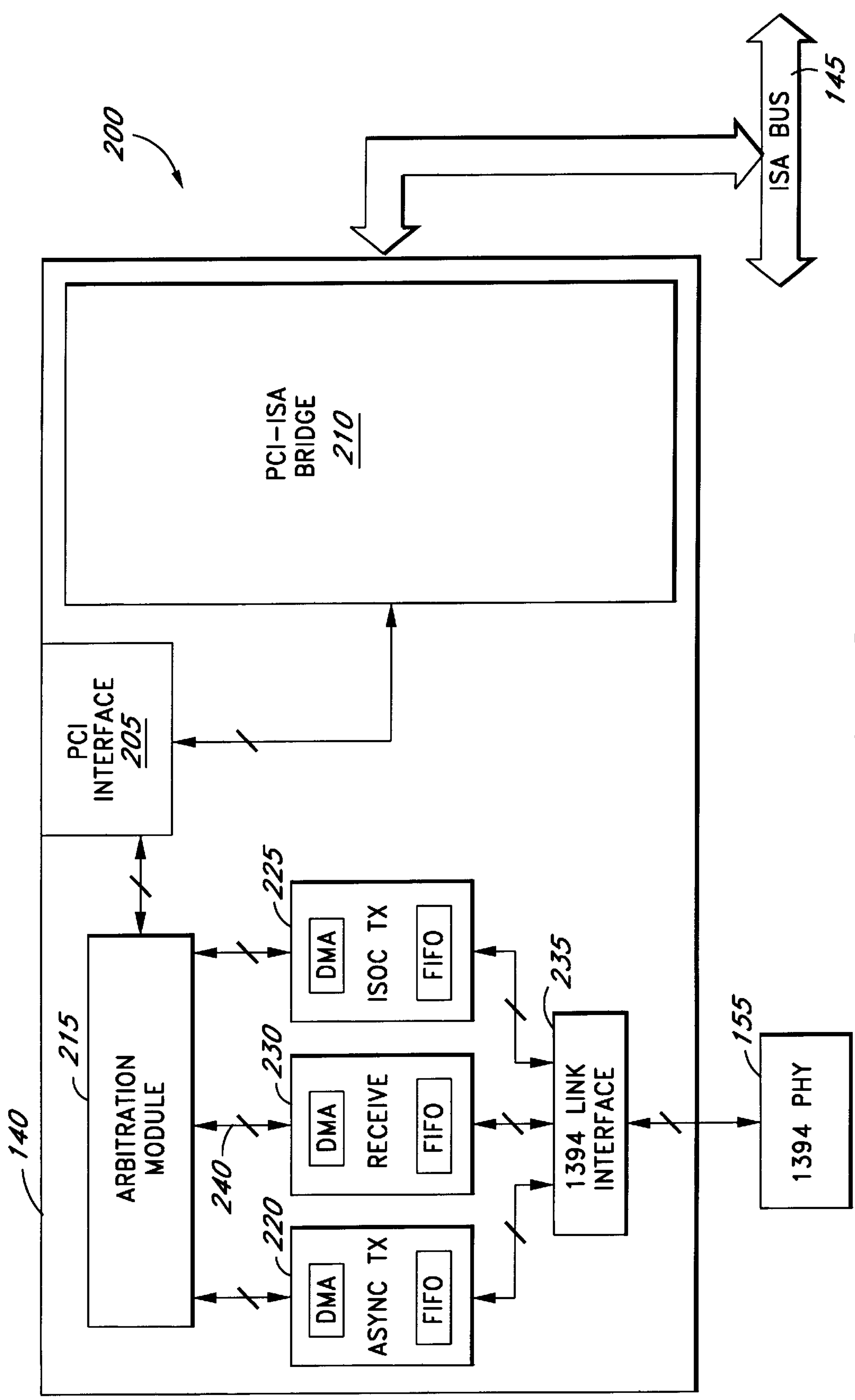
FIG. 2 illustrates an exemplary embodiment of the south bridge in accordance to the teachings of the present invention.

FIG. 2 illustrates an exemplary embodiment of the south bridge 140 in accordance to the teachings of the present invention. Referring to FIGS. 1 and 2, the south bridge 140 includes a PCI interface module 205 which interfaces with a PCI to ISA bridge 210 and an arbitration module 215. The PCI to ISA bridge 210 allows transactions between one or more expansion peripheral devices $\mathbf{150}_1$–$\mathbf{150}_N$ and devices coupled to the PCI bus 130, processor 105, and system memory 120. The arbitration module 215 is coupled to asynchronous transmit module 220 (referred to as "ATX module"), isochronous transmit module 225 (referred to as "ITX module"), and receive module 230 by way of a plurality of signal lines 240. The arbitration module 215 performs the necessary arbitration between the ATX, ITX, and receive modules 220, 225, and 230 to access the PCI bus 130.

The ATX, ITX, and receive modules 220, 225, and 230 are coupled to a 1394 link interface 235 which provides the necessary interface to the 1394 serial bus. In particular, The 1394 link interface 235 serializes and de-serializes data streams. For example, the 1394 link interface 235 translates data buses having different data widths (e.g., quadlet to byte bus width translations). The 1394 link interface 235 is coupled to the physical link interface 155 which is connected to the 1394 serial bus. The ATX module 220 transmits asynchronous data packets to serial peripheral devices on the 1394 serial bus while the ITX module 225 transmits isochronous data packets to serial peripheral devices on the 1394 serial bus. The receive module 230, on the other hand, receives both asynchronous and isochronous data packets from serial peripheral devices on the 1394 serial bus. In another implementation, separate asynchronous and isochronous receive modules may be used. Asynchronous transmission of data places emphasis on guaranteed delivery of data over guaranteed timing whereas isochronous transmission of data places emphasis on guaranteed timing of data over delivery of data. An example of an isochronous serial peripheral device is a digital camera used for video conferencing.

FIG. 3 illustrates an exemplary embodiment of a receive module 230 of the present invention. In particular, the present invention describes a circuit that increases the arbitration priority of a receive FIFO for draining data based on a programmable high watermark value. Further, the present invention includes a mechanism for maintaining the arbitration priority for draining the receive FIFO below the high watermark value based on a programmable hysteresis watermark value.

Referring to FIG. 3, the receive module 230 includes a data packet decoder 305 which is coupled to the physical link interface 235 of FIG. 2. The data packet decoder 305 decodes data packets received from the 1394 serial bus and determines whether the data packets are addressed to the receive module 230. If the data packets are addressed to the receive module 230, the data packet decoder 305 forwards the data packets to a receive FIFO 310, otherwise the data packets are ignored. In one embodiment, the receive FIFO 310 is a circular buffer being a quadlet (four bytes) of data wide and two kilo bytes deep, although other arrangements are possible. The receive FIFO 310 receives asynchronous and isochronous data packets from the 1394 serial bus. The output of the receive FIFO 310 is coupled to an asynchronous direct memory access ("DMA") engine 315 (hereinafter referred to as an "async DMA engine") and an isochronous DMA engine 320 (hereinafter referred to as an "isoc DMA engine"). In another embodiment, more than two DMA engines may be used. The output of the receive FIFO 310 is also coupled to an internal arbiter 385 which detects the type of data packet received (e.g., asynchronous or isochronous).

The receive FIFO 310 is coupled to a FIFO fill pointer register 330 and a FIFO drain pointer register 325. The FIFO fill pointer register 330 is a marker that indicates the location in the FIFO 310 where the next quadlet of data is to be written to and the FIFO drain pointer register 325 is a marker that indicates the location in memory where the next quadlet of data is to be drained from. The FIFO fill pointer register 330 and the FIFO drain pointer register 325 are coupled to a quadlet count circuit 335 which determines the number of quadlets contained in the receive FIFO 310 at any one time by mathematical manipulation of the FIFO fill pointer register 330 and the FIFO drain pointer register 325.

The output of the quadlet count circuit 335 is coupled to the internal arbiter 385 from which the internal arbiter 385 can determine the number of quadlets of data contained in the receive FIFO 310. In one embodiment, as soon as the internal arbiter 385 detects a predetermined amount of data (e.g., a cache line or 8 quadlets of data) received by the receive FIFO 310, the internal arbiter 385 either signals the async DMA engine 315 by way of an IAGNT signal on signal line 390 or the isoc DMA engine 320 by way of an IIGNT signal on signal line 395, depending on the type of data packet received. Assertion of the IAGNT signal causes the async DMA engine 315 to assert a normal async request (AREQ) signal on signal line 365 to access the PCI bus 130 of FIG. 1. Correspondingly, the assertion of the IIGNT signal causes the isoc DMA engine 320 to assert a normal isoc request (IREQ) signal on signal line 375 to access the PCI bus 130 of FIG. 1. The IAGNT and the IIGNT signals are mutually exclusive in that they are never asserted at the same time.

Although the assertion of the IAGNT signal or the IIGNT signal necessarily causes the assertion of the AREQ signal or the IREQ signal, respectively, the async DMA engine 315 may assert AREQ independent of whether IAGNT is asserted and the isoc DMA engine 320 may assert IREQ independent of whether IIGNT is asserted. This is because the DMA engines perform other tasks besides draining the receive FIFO 310. In particular, either DMA engine may, among other things, fetch commands (or command descriptors) from memory, write-back status information to memory, and perform any other non-FIFO related functions.

The output of the quadlet count circuit 335 is also coupled to a first input of a first comparator 340 with an output of a high watermark programmable register 345 being coupled to a second input of the first comparator 340. In one embodiment, the high watermark programmable register 345 is three bits wide to define eight-256 byte increments (for a 2K-byte FIFO), although a higher or lower granularity may be used in lieu thereof. That is, each increment represents 64 quadlets of data. Thus, if the high watermark programmable register 345 is programmed with a "7" hexadecimal, the high watermark programmable register output is 448 quadlets of data, which is referred to as a high watermark boundary (see FIG. 4A). If the output of the quadlet count circuit 335 is greater than (or equal to) the output of the high watermark programmable register 345, the output (HWM) of the first comparator 340 is asserted (e.g., active high) on signal line 343.

The output of the high watermark programmable register 345 is also coupled to a first input of a subtractor 342 with an output of a hysteresis programmable register 355 being coupled to a second input of the subtractor 342. The output of the subtractor 342 is the difference between the output of the high watermark programmable register 345 and the output of the hysteresis programmable register 355. The output of the subtractor 342 is coupled to a first input of a second comparator 350 with the output of the quadlet count circuit 335 being coupled to a second input of the comparator 350. In one embodiment, the hysteresis programmable register 355 is three bits wide to define eight-32 byte increments, although a higher or lower granularity may be used in lieu thereof. That is, each increment represents eight quadlets of data. Thus, if the hysteresis programmable register 355 is programmed with a "7" hexadecimal, the hysteresis programmable register output is 56 quadlets of data. This value is subtracted from the high watermark boundary and the result of this subtraction is referred to as a hysteresis boundary (see FIG. 4A). If the output of the quadlet count circuit 335 is greater than (or equal to) the hysteresis boundary, the output (HYS) of the second comparator 350 is asserted (e.g., active high) on signal line 353. Both the first and second comparator outputs HWM and HYS are fed to a priority generation circuit 360.

The priority generation circuit 360 asserts a priority drain ("PD") signal on signal line 362 when the quadlet count in the receive FIFO 310 is equal to (or greater than) a high watermark boundary (i.e., the value programmed in the high watermark programmable register). When the quadlet count in the receive FIFO 310 falls below the high watermark boundary, the PD signal continues to be asserted until the quadlet count falls below the hysteresis boundary, at which point the PD signal is deasserted. The signal line 362 of the priority generation circuit 360 is coupled to the async and isoc DMA engines 315 and 320. When PD is asserted, either the async DMA engine 315 or the isoc DMA engine 320 (depending on the type of data that is on top of the receive FIFO to be drained) dynamically changes the draining priority of the receive FIFO 310 to the highest priority, as will be described below.

For example, if asynchronous data is at the top of the receive FIFO 310 when the high watermark boundary is reached, the PD signal is asserted to cause the async DMA engine 315 to assert an async priority request ("APREQ") signal on signal line 370, indicating to the arbitration module 215 of FIG. 2 that the async DMA engine 315 has the highest priority to access the PCI bus and, among other things, drain the receive FIFO 310 into memory 120. On the other hand, if isochronous data is at the top of the receive FIFO 310 when the high watermark boundary is reached, the PD signal is asserted to cause the isoc DMA engine 320 to assert an isoc priority request ("IPREQ") signal on signal line 380, indicating to the arbitration module 215 of FIG. 2 that the isoc DMA engine 320 has the highest priority to access the PCI bus and, among other things, drain the receive FIFO 310 into memory 120. Thus, with PD asserted, either the async DMA engine 315 asserts APREQ or the isoc DMA engine 320 asserts IPREQ, depending on the type of data that is on top of the receive FIFO 310. The APREQ and the IPREQ signals are mutually exclusive signals in that both are never asserted at the same time.

Figure 4A:
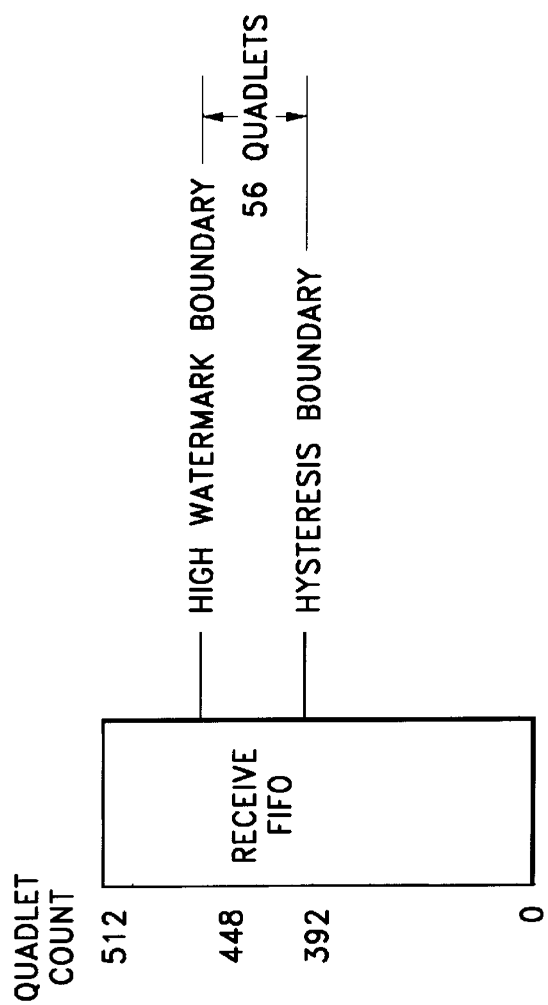
FIG. 4A illustrates an exemplary embodiment of the present invention.
Figure 4B:
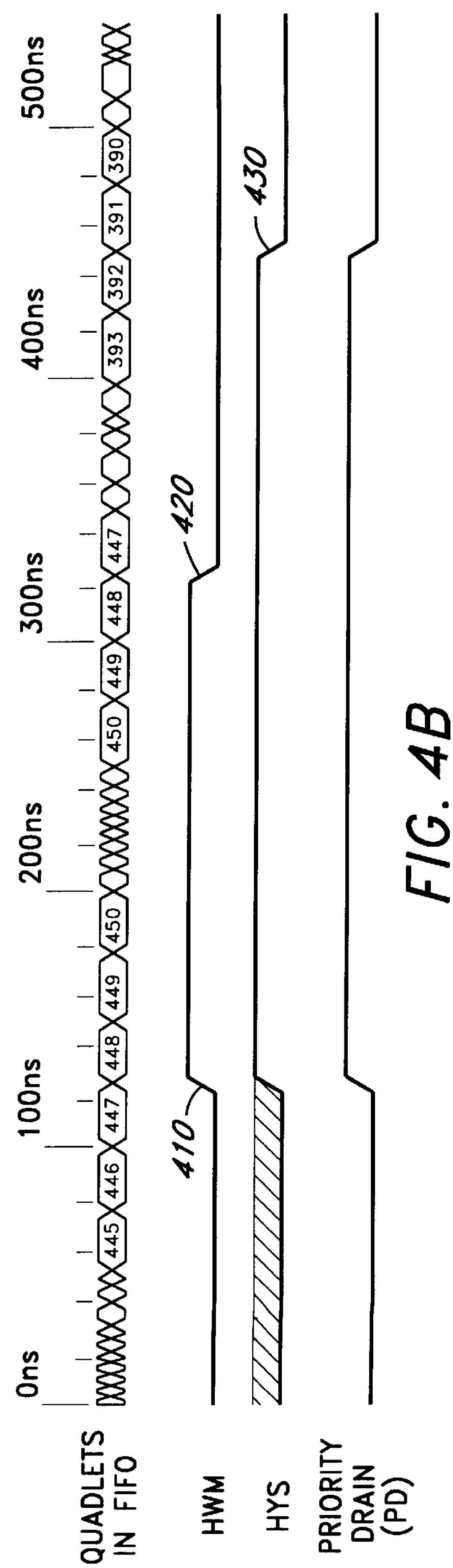
FIG. 4B illustrates an exemplary timing diagram of various signals of the priority generation circuit.

FIG. 4B illustrates an exemplary timing diagram of various signals of the priority generation circuit 360. Referring to FIGS. 4A and 4B, when the quadlet count in the receive FIFO 310 reaches the high watermark boundary (e.g., 448 quadlets of data), the HWM signal is asserted at time 410. Prior to time 410, the HYS signal may be asserted, however, at time 410, HYS is asserted. The assertion of the HWM signal causes the PD signal to be asserted, which indicates the highest priority. At time 420, as the receive FIFO is drained to the point that the quadlet count falls below the high watermark boundary, the PD signal remains asserted. The draining of the receive FIFO remains the highest priority until the quadlet count falls below the hysteresis boundary (e.g., 392 quadlets of data), as shown at time 430. At this time, the HYS and PD signals are deasserted.

Figure 5A:
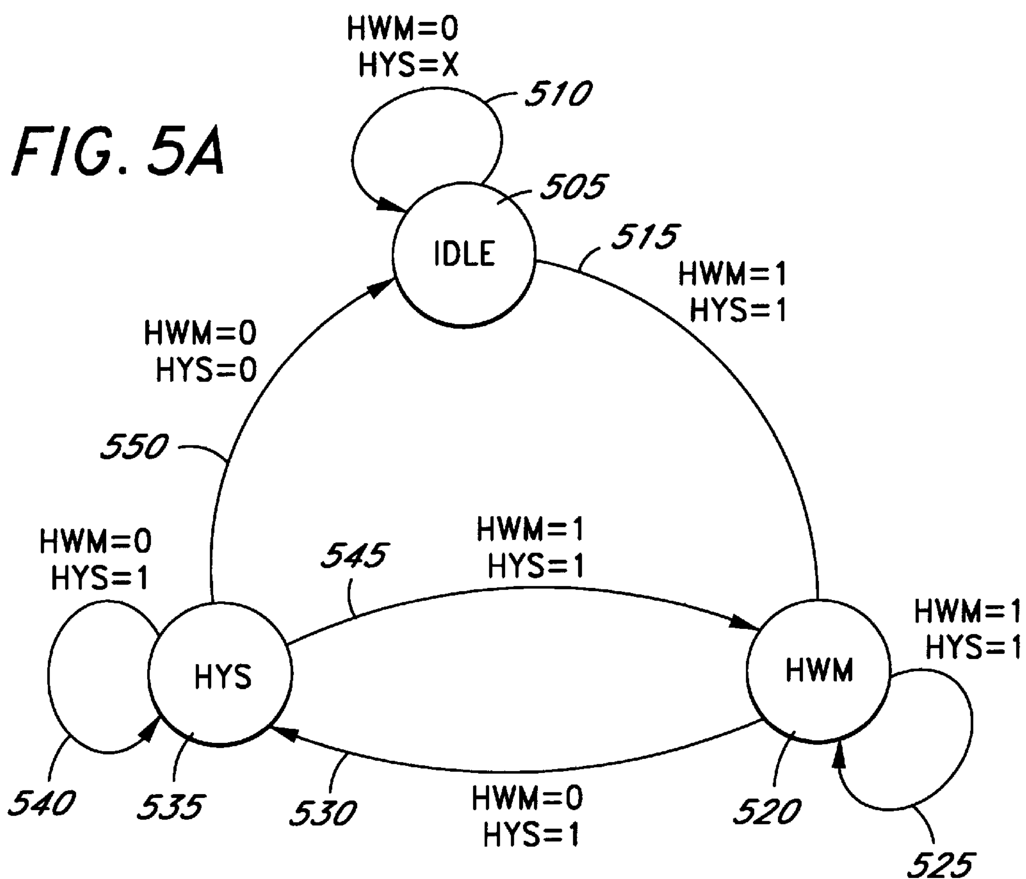
FIG. 5A illustrates a state diagram which represent the operation of the priority generation circuit of FIG. 3.

FIG. 5A illustrates a state diagram which represent the operation of the priority generation circuit 360 of FIG. 3. Referring to FIGS. 3, 4A, and 5A, the state diagram commences in an idle state 505. As long as the HWM signal is deasserted, the priority generation circuit 360 remains in the idle state 505 as shown by arrow 510. In the idle state 505, the PD signal is deasserted. When the HWM signal is asserted (indicating that the quadlet count has reached the high watermark boundary), the state changes to a HWM state 520 as shown by arrow 515. In the HWM state 520, the PD signal is asserted. As long as the HWM signal is asserted, the state remains at the HWM state 520, as shown by arrow 525. When the HWM signal becomes deasserted, indicating that the quadlet count in the receive FIFO 310 has fallen below the high watermark boundary, the state changes to a HYS state 535 as shown by arrow 530.

In the HYS state 535, the PD signal remains asserted. As long as the HYS signal remains asserted, the state remains in the HYS state 535, as shown by arrow 540. While in the HYS state 535, if the HWM signal is again asserted, indicating that the quadlet count in the receive FIFO 310 has risen to (or above) the high watermark boundary, the state changes back to the HWM state 520 as shown by arrow 545. On the other hand, if the HYS signal is deasserted, indicating that the quadlet count in the receive FIFO 310 has fallen below the hysteresis boundary, the state changes back to the idle state 505 (as shown by arrow 550) and the PD signal becomes deasserted.

Figure 5B:
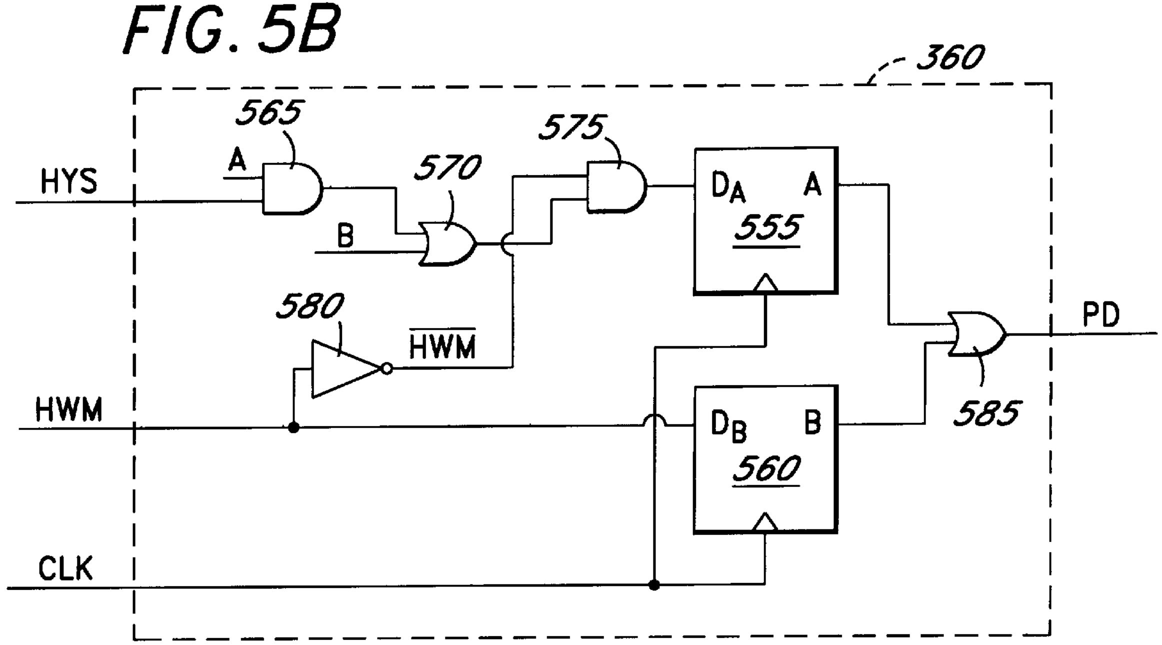
FIG. 5B illustrates an exemplary priority generation circuit of the present invention in accordance to the state diagram of FIG. 5A.

FIG. 5B illustrates an exemplary priority generation circuit 360 of the present invention in accordance to the state diagram of FIG. 5A. Referring to FIGS. 3 and 5B, the priority generation circuit 360 includes first and second flip flops ("FFs") 555 and 560 with a clock signal, CLK, coupled to the clock inputs. These FFs (e.g., D-type) 555 and 556 are clocked with a master clock, however, it is to be noted that the priority generation circuit 360 may be implemented without the need for a clock signal. The HWM signal on signal line 343 is coupled to the input of the second FF 560 with a logic circuit including the HYS signal on signal line 353, AND gates 565 and 575, OR gate 570, and inverter 580 coupled to the input of the first FF 555. In the idle state, the output of the FFs 555 and 560 and the HWM and HYS signals are low, thus proving a low output on the PD signal. As HWM goes high, output B goes high on the next clock, thus driving the PD signal high. As HWM goes low and HYS remains high, output B goes low and output A goes high (on the next clock), thus maintaining PD high. As HYS goes low, output A follows on the next clock, thus driving PD low.

Figures 6, 6A, 6B:
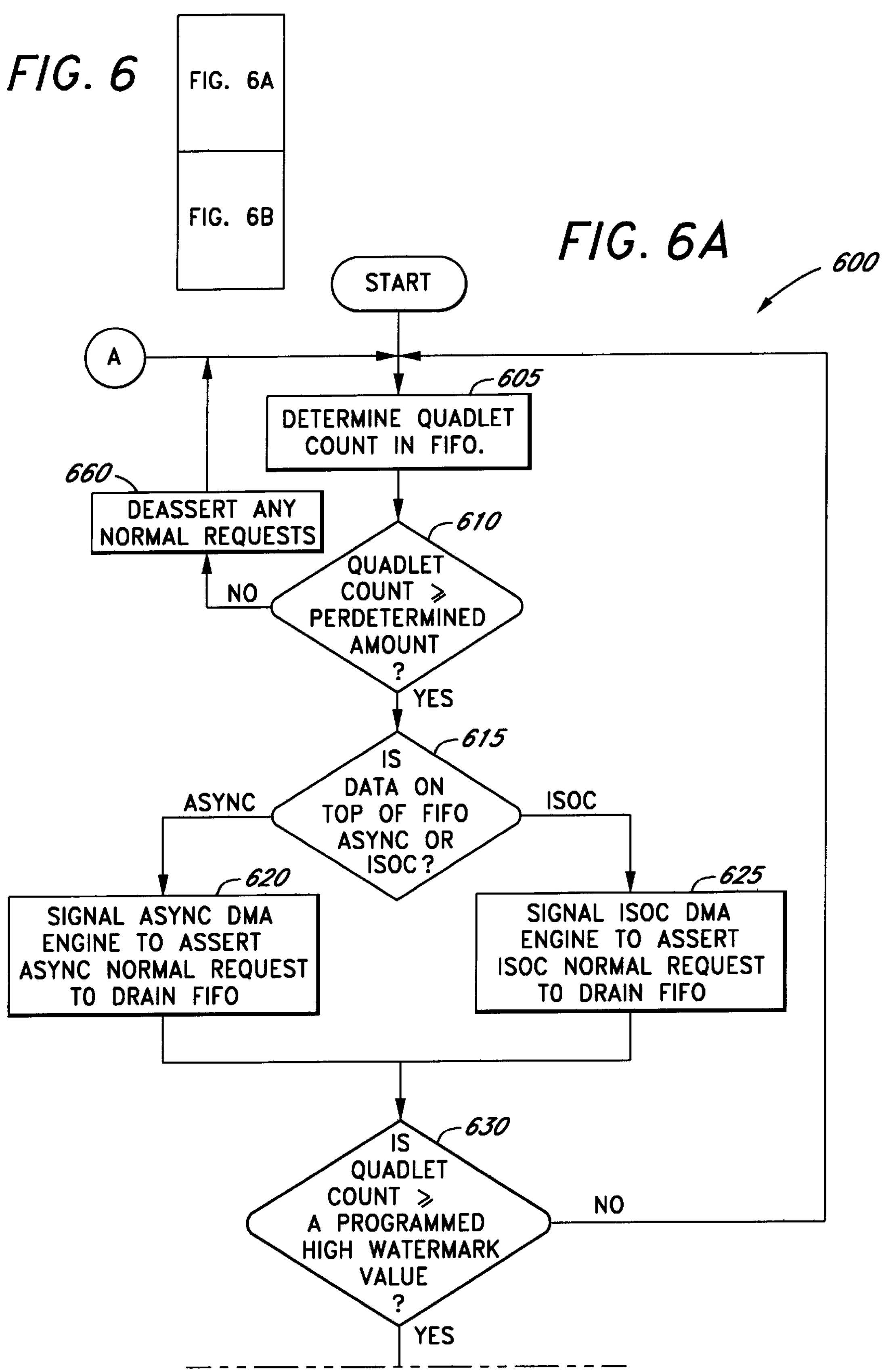
FIG. 6 is a flow diagram illustrating an exemplary process for implementing the present invention.
Figure 6B:
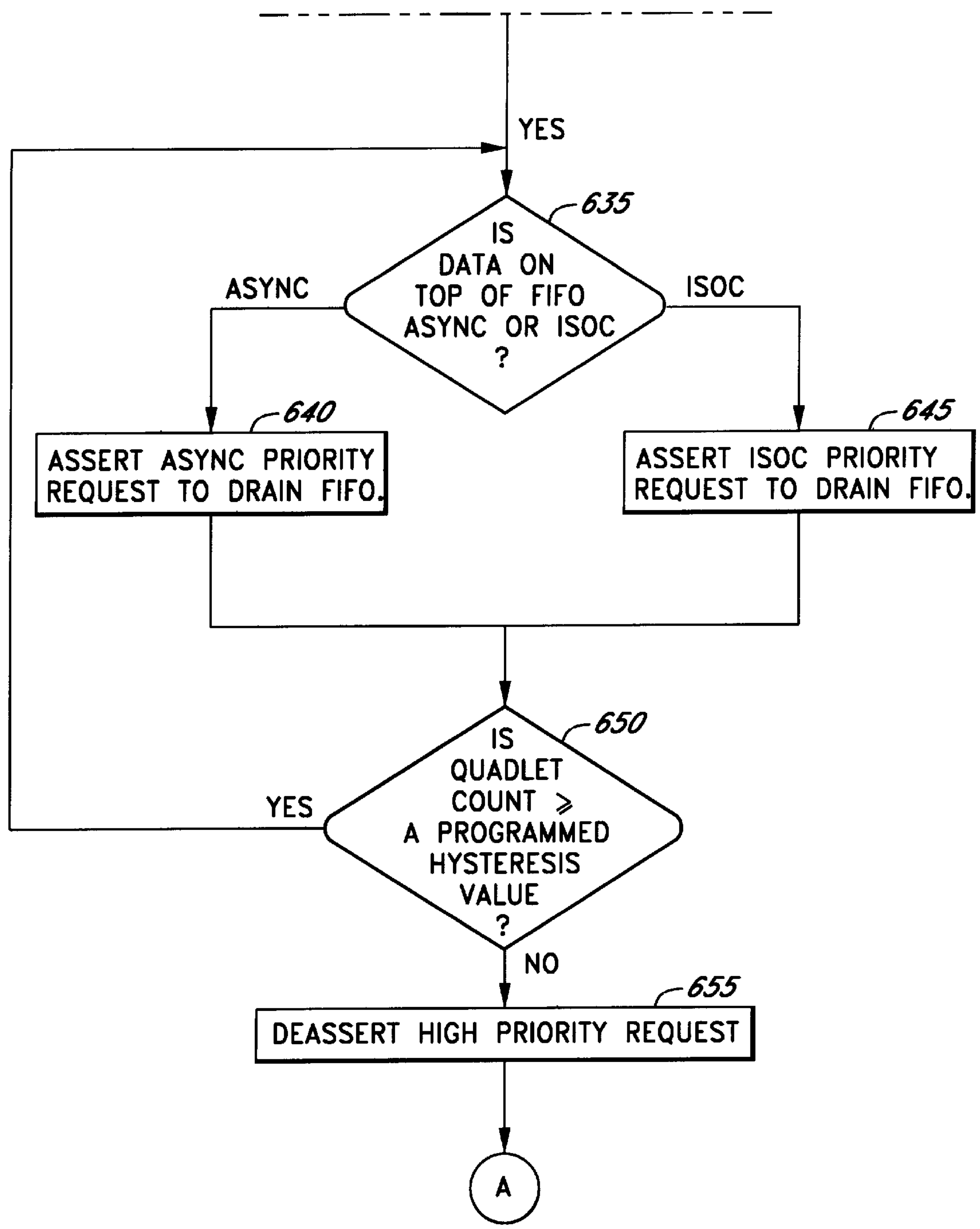

FIG. 6 is a flow diagram illustrating an exemplary process 600 for implementing the present invention. Referring to FIG. 6, the process 600 commences at Step 605 where the quadlet count in the receive FIFO is determined. At Step 610, a determination is made as to whether the quadlet count is greater than (or equal to) a predetermined amount (e.g., a cache line of data or 32 quadlets). If the quadlet count is not greater than (or equal to) the predetermine amount, the process moves to Step 660 where the asserted normal request (async or isoc), if any, is deasserted. The process then jumps back to Step 605.

If the quadlet count is greater than (or equal to) the predetermined amount, the process proceeds to Step 615. At Step 615, a further determination is made as to whether the data on top of the receive FIFO is asynchronous data or isochronous data. If the data is asynchronous data, the process proceeds to Step 620 where an async DMA engine is signaled (see IAGNT signal of FIG. 3) to assert an async normal request for accessing the system bus and draining the asynchronous data from the receive FIFO. On the other hand, if the data is isochronous data, the process proceeds to Step 625 where an isoc DMA engine is signaled (see IIGNT signal of FIG. 3) to assert an isoc normal request for accessing the system bus and draining the isochronous data from the receive FIFO. As mentioned above, the IAGNT and IIGNT signals are mutually exclusive in that both are never asserted at the same time. This is to be distinguished from the AREQ and IREQ signals which may both be asserted at the same time (see discussion above with respect to FIG. 3).

The process then continues to Step 630, where a determination is made as to whether the quadlet count is greater than (or equal to) a programmed high watermark value. If so, the process continues to Step 635, otherwise the process jumps back to Step 605. At Step 635, if the data on top of the receive FIFO is asynchronous data, the process moves to Step 640 where the async DMA engine is signaled to assert an async priority request to access the system bus and drain the FIFO (e.g., in memory). However, if the data on top of the receive FIFO is isochronous data, then the process proceeds to Step 645 where the isoc DMA engine is signaled to assert an isoc priority request to access the system bus and drain the FIFO.

Continuing to refer to FIG. 6, the process then continues to Step 650, where a determination is made as to whether the quadlet count is greater than (or equal to) a programmed hysteresis value. If so, the process jumps back to Step 635. If the quadlet count becomes equal to (or less than) the programmed hysteresis value, the process moves to Step 655. At Step 655, the priority request is deasserted (async or isoc). The process then jumps back to Step 605.

The advantage of the present invention is that the arbitration priority of a receive FIFO may be dynamically changed based on the quadlet count. This allows for a FIFO to slowly reach a threshold prior to requesting a high priority drain. Moreover, the present invention includes hysteresis on the FIFO which reduces thrashing of bandwidth requests if the quadlet count in the FIFO oscillates around the high watermark boundary. In addition, having programmable registers allows software or basic input/output system ("BIOS") to change the high watermark and hysteresis mark boundaries to fine tune system performance.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method comprising:

detecting data received in a first-in/first-out (FIFO) from one or more devices from a first bus;

asserting a request to a bus arbiter that is coupled to a second bus having a plurality of devices coupled thereto to access the second bus for draining data from the FIFO, the bus arbiter receiving one or more other requests from one or more other devices to access the second bus;

determining a difference between a location where a receiving unit of data is to be written and a location where a draining unit of data is to be drained in the FIFO;

detecting when the difference has reached a predetermined high watermark value by comparing the predetermined high watermark value to the difference;

asserting a higher priority request to the bus arbiter to gain access to the second bus over other pending requests, if any, responsive to detecting when the difference has reached the predetermined high watermark value; and requesting a highest priority to the bus arbiter by a DMA engine to drain the FIFO to the one or more devices coupled to the second bus, the DMA engine being one of an asynchronous and isochronous DMA engines.

2. The method of claim 1 further comprising:

detecting when the difference has fallen below a hysteresis boundary by comparing the difference to the hysteresis boundary, the hysteresis boundary being a difference between a high watermark boundary representing the predetermined high watermark value and a predetermined hysteresis value; and deasserting the higher priority request to the bus arbiter if the difference falls below the hysteresis boundary.

3. The method of claim 2 further comprising loading a first value in a high watermark programmable register to provide the predetermined high watermark value.

4. The method of claim 3 further comprising loading a second value in a hysteresis programmable register to provide the predetermined hysteresis value.

5. The method of claim 1 wherein the determining the difference comprises:

indicating a fill location in the FIFO using a fill pointer where the receiving unit of data is to be written;

indicating a drain location in the FIFO using a drain pointer where the draining unit of data is to be drained; and manipulating a fill pointer value and a drain pointer value to calculate the difference.

6. The method of claim 1 wherein the detecting when the difference has reached the predetermined high watermark value occurs when the difference is greater than or equal to the predetermined high watermark value.

7. The method of claim 1 further comprising:

detecting whether data on top of the FIFO is asynchronous data or isochronous data when the difference reaches the high watermark value.

8. An apparatus comprising:

a first-in/first-out (FIFO) to receive data from one or mote devices from a first bus;

a data count circuit coupled to the FIFO to determine a difference, the difference being a difference between a location where a receiving unit of data is to be written and a location where a draining unit of data is to be drained in the FIFO;

a comparator to compare the difference with a predetermined high watermark value;

a priority generation circuit coupled to the comparator, the priority generation circuit to provide a priority drain signal in response to the difference being equal to or alternatively greater than the predetermined high watermark value; and a direct memory access (DMA) circuit coupled to the priority generation circuit and the data count circuit, the DMA circuit to assert a signal to a bus arbiter to access a second bus having a plurality of devices coupled thereto, responsive to the difference being greater than the predetermined high watermark value, the DMA circuit to assert a priority signal to the bus arbiter to access the second bus over other pending signals received by the bus arbiter from other devices.

9. The apparatus of claim 8 further comprising:

a subtractor to subtract a predetermined hysteresis value from the predetermined high watermark value to generate a hysteresis boundary;

a second comparator to compare the difference with the hysteresis boundary, wherein the priority generation circuit maintains the assertion of the priority drain signal as long as the difference is equal to or greater than the hysteresis boundary.

10. The apparatus of claim 8 wherein the data count circuit comprises:

a FIFO fill pointer register having a fill value, the FIFO fill pointer register to point to a first location in the FIFO where the receiving unit of data is to be written;

a FIFO drain pointer register having a drain value, the FIFO drain pointer register to point to a second location in the FIFO where the draining unit of data is to be drained from, wherein the fill value and the drain value are manipulated to calculate the difference.

11. The apparatus of claim 8 wherein the FIFO receives one of asynchronous and isochronous data.

12. The apparatus of claim 11 further comprising an internal arbiter coupled to the FIFO, the internal arbiter to detect whether asynchronous or isochronous data is on top of the FIFO.

13. The apparatus of claim 12 further comprising an asynchronous DMA engine coupled to the FIFO and the internal arbiter, the asynchronous DMA engine to generate a request signal to drain the FIFO when asynchronous data is on top of the FIFO.

14. The apparatus of claim 12 further comprising an isochronous DMA engine coupled to f the FIFO and the internal arbiter, the isochronous DMA engine to generate a request signal to drain the FIFO when isochronous data is on top of the FIFO.

15. The method of claim 1 wherein the detecting data received in the FIFO comprises detecting data received in the FIFO from a serial bus.

16. The apparatus of claim 8 wherein the first bus is a serial bus.

17. A system, comprising:

a first bus having a first plurality of devices coupled thereto and a second bus having a second plurality of devices coupled thereto; and a module coupled between the first and second buses for temporarily storing data received from one or more of the first plurality of devices on the first bus and for draining the data to one or more of the second plurality of devices on the second bus, the module comprising:

a first-in/first-out (FIFO) to receive data;

a data count circuit coupled to the FIFO to determine a difference, the difference being a difference between a location where a receiving unit of data is to be written and a location where a draining unit of data is to be drained, a comparator to compare the difference with a predetermined high watermark value, a priority generation circuit coupled to the comparator, the priority generation circuit to provide a priority drain signal in response to the difference being equal to or alternatively greater than the predetermined high watermark value, and a direct memory access (DMA) circuit coupled to the priority generation circuit and the data count circuit, the DMA circuit to assert a signal to a bus arbiter to access a second bus having a plurality of devices coupled thereto, responsive to the difference being greater than the predetermined high watermark value, the DMA circuit to assert a priority signal to the bus arbiter to access the second bus over other pending signals received by the bus arbiter from other devices.

18. The system of claim 17 further comprising:

a subtractor to subtract a predetermined hysteresis value from the predetermined high watermark value to generate a hysteresis boundary;

a second comparator to compare the difference with the hysteresis boundary, wherein the priority generation circuit maintains the assertion of the priority drain signal as long as the difference is equal to or greater than the hysteresis boundary.

19. The system of claim 17 wherein the first bus is a serial bus.

20. The system of claim 19 wherein the serial bus is a high speed serial bus, and the second bus is a peripheral component interconnect bus.

21. The system of claim 17 further comprising a processor coupled to the second bus.

22. The system of claim 17 further comprising a memory coupled to the second bus, the circuit to drain the data from the FIFO to the memory.

23. The system of claim 17 wherein the data count circuit comprises:

a FIFO fill pointer register having a fill value, the FIFO fill drain pointer register to point to a first location in the FIFO where the receiving unit of data is to be written;

a FIFO drain pointer register having a drain value, the FIFO drain pointer register to point to a second location in the FIFO where the draining unit of data is to be drained from, wherein the fill value and the drain value are manipulated to calculate the difference.

24. The system of claim 17 wherein the FIFO receives one of asynchronous and isochronous data.

25. The system of claim 24 wherein the DMA circuit comprises an internal arbiter coupled to the FIFO, the internal arbiter to detect whether asynchronous or isochronous data is on top of the FIFO.

26. The system of claim 25 wherein the DMA further comprises an asynchronous DMA engine coupled to the FIFO and the internal arbiter, the asynchronous DMA engine to generate a request signal to drain the FIFO when asynchronous data is on top of the FIFO.

27. The system of claim 25 wherein the DMA further comprises an isochronous DMA engine coupled to the FIFO and the internal arbiter to generate a request signal to drain the FIFO when isochronous data is on top of the FIFO.

* * * * *

UNITED STATES PATENT AND TRADEMARK OFFICE
CERTIFICATE OF CORRECTION

PATENT NO. : 6,192,428 B1
DATED : February 20, 2001
INVENTOR(S) : Abramson et al.

It is certified that error appears in the above-identified patent and that said Letters Patent is hereby corrected as shown below:

Column 10,
Line 2, after "to" delete "f".
Line 66, delete "drain".

Signed and Sealed this

Sixteenth Day of April, 2002

Attest:

JAMES E. ROGAN
*Director of the United States Patent and Trademark Office*

*Attesting Officer*